United States Patent
Pauly

(10) Patent No.: US 7,675,866 B1
(45) Date of Patent: Mar. 9, 2010

(54) METHOD AND SYSTEM FOR ANALYZING RESOURCE NEEDS FOR A CONFIGURABLE COMPUTING SYSTEM

(75) Inventor: Martin Pauly, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1201 days.

(21) Appl. No.: 11/234,458

(22) Filed: Sep. 24, 2005

(51) Int. Cl.
*H04L 1/00* (2006.01)

(52) U.S. Cl. .................. 370/252; 370/256; 370/432; 714/4; 714/37

(58) Field of Classification Search .............. None
See application file for complete search history.

(56) References Cited

U.S. PATENT DOCUMENTS

| 5,347,647 | A | 9/1994 | Allt |
|---|---|---|---|
| 6,256,773 | B1 | 7/2001 | Bowman-Amuah |
| 6,470,464 | B2* | 10/2002 | Bertram et al. ............... 714/37 |
| 6,496,941 | B1* | 12/2002 | Segal et al. .................... 714/4 |
| 6,662,357 | B1 | 12/2003 | Bowman-Amuah |
| 6,789,049 | B2 | 9/2004 | Gross |
| 2003/0012216 | A1* | 1/2003 | Novaes ........................ 370/432 |

\* cited by examiner

*Primary Examiner*—Chirag G Shah
*Assistant Examiner*—Salvador E Rivas
(74) *Attorney, Agent, or Firm*—Matthew J. Evans; Daniel M. Barbieri

(57) ABSTRACT

A method and system for analyzing resource needs for a configurable computing system representing the configuration in a tree structure. The tree structure has a plurality of nodes representing stored data. A first set of the nodes comprises childless nodes and a second set of the nodes comprises parent nodes. Each parent node has at least one child node. The method for analyzing comprises the steps of: (a) determining the worst case resource needs of the childless nodes during an execution cycle by evaluating the worst case values of any selected attributes that the childless node may have; (b) determining the worst case resource needs of the parent nodes during an execution cycle; and, (c) recursively applying the rules used for evaluating the worst case resource needs of the individual nodes, above, starting with a root node of the plurality of nodes, to determine the worst case resource needs of the entire tree structure.

4 Claims, 3 Drawing Sheets

METHOD AND SYSTEM FOR ANALYZING RESOURCE NEEDS FOR A CONFIGURABLE COMPUTING SYSTEM

BACKGROUND OF THE INVENTION

1. Field of the Invention

The present invention relates to capacity management in a computer system such as server or network and, more particularly, to a method and system for analyzing the resource needs of a computer system that uses highly configurable software.

2. Description of the Related Art

The certification authorities require that safety-critical software that is used on aircrafts is verified. This verification is mostly done through functional testing, during which one determines whether or not the software meets all applicable the software requirements. Another required step is an analysis of resource needs, in particular the need for different types of memory and computing time on the target platform. The idea of this analysis is to rule out any potential for the computing system running out of memory or taking longer than is acceptable to perform a certain task. This applies also to safety critical software systems outside of the aviation world, for example in automotive and medical systems.

Traditionally, this analysis is done by determining a set of worst-case scenarios and then validating that the software does indeed work for in these worst cases. This is quite feasible as long as what the software does is predictable and well understood. If the software later changes, a change impact analysis determines (among other things) whether the worst-case scenarios have changed and/or if the validation needs to be completed. For example, relative to avionics applications, when software applications can be configured by the (airline) customer to do things in different ways, the various different options that can be chosen through this configuration need to be taken into account when determining the worst-case scenarios.

Specifically, a new avionics software application called "ARINC 661 Graphics Server" (AGS), developed by present assignee, Rockwell Collins, Inc., is so highly configurable that it is impossible to predict its resource needs in a generic way. Instead, the resource needs become a function of the configuration data that is loaded into the AGS. This AGS configuration can be modified by Rockwell Collins and/or their customers, and especially if the customer makes a modification to the AGS configuration, it may not always be easy for them to accurately assess the effect that this change has on the performance of the system in general, and whether the AGS with the modified configuration would still pass a traditional worst-case analysis in particular.

As will be disclosed in detail below, to address this concern, Rockwell Collins is developing a software tool named "Resource Analyzer" that reads an entire AGS configuration and computes worst-case data for memory consumption (both heap and stack memory) and processor utilization, both for the main processor and for the special graphics processor. The customer can then evaluate the performance effect that the configuration change has. If the Resource Analyzer is qualified (following the DO-178B guidelines for software tool qualification), it can completely eliminate any manual worst-case analysis through a traditional system test. Even if it is not qualified, it can still compute the required data, even though this data has to be manually validated.

SUMMARY OF THE INVENTION

In a broad aspect, the present invention is a method and system for analyzing resource needs for a configurable computing system representing the configuration in a tree structure. The tree structure has a plurality of nodes representing stored data. A first set of the nodes comprises childless nodes and a second set of the nodes comprises parent nodes. Each parent node has at least one child node. The method for analyzing comprises the steps of: (a) determining the worst case resource needs of the childless nodes during an execution cycle by evaluating the worst case values of any selected attributes that the childless node may have; (b) determining the worst case resource needs of the parent nodes during an execution cycle; and, (c) recursively applying the rules used for evaluating the worst case resource needs of the individual nodes, above, starting with a root node of the plurality of nodes, to determine the worst case resource needs of the entire tree structure.

The step of determining the worst case resource needs of the parent nodes is accomplished by: (i) determining the worst case resource needs of the child nodes of a given parent node, by evaluating the worst case values of any selected attributes that each child node may have; (ii) determining the partial worst case resource needs of the given parent node, by evaluating the worst case values of any selected attributes that given parent node may have, as if that given parent node is a childless node; and, (iii) summing a) the worst case resource needs of the child nodes of the given parent node and, b) the partial worst case resource needs of the given parent node.

The utilization of the present inventive concepts for new highly configurable systems to determine resource needs simplifies the reuse of the systems and commensurately reduces costs. Traditionally, the worst case performance of a system is measured (as opposed to predicted) by running the actual software system in a specific configuration through assumed worst case scenarios. Any change of the configuration requires these measurements to be repeated, which is time consuming and costly. The invention allows configuration changes to happen without the need to repeat measurements of worst case resource needs; instead, those needs can be predicted through an automated analysis, using the method described herein.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
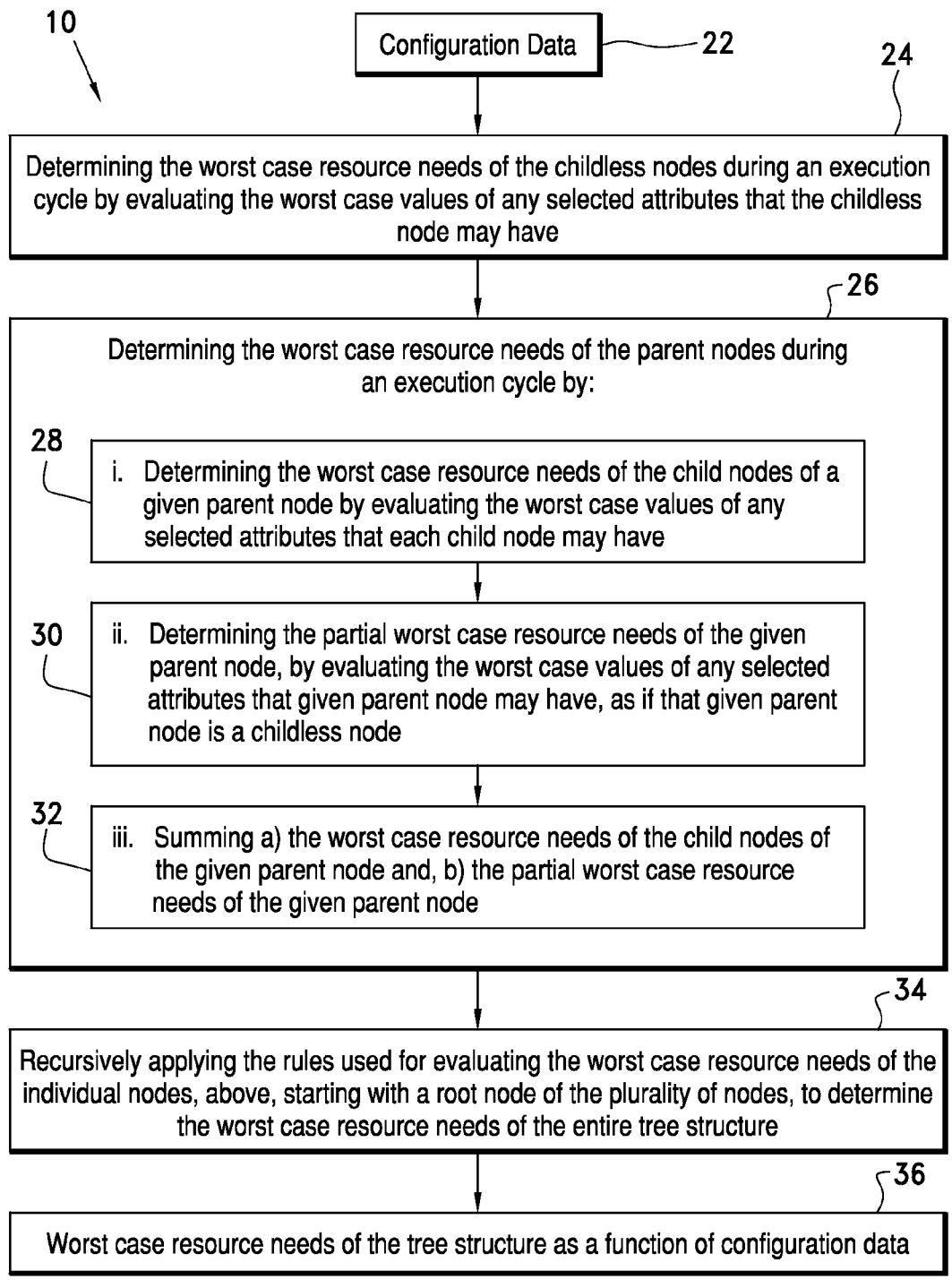
FIGS. 1 and 3 are flow charts illustrating the method and means for analyzing resource needs for a configurable computing system, of the present invention.

Referring now to the drawings and the characters of reference marked thereon, FIG. 1 illustrates a method of analyzing resource needs for a configurable computing system, this method being designated generally as 10. As noted above, some software applications are so highly configurable that prediction of resource needs in a generic way cannot be accomplished. Instead, the resource needs become a function of the configuration data that is loaded into the software application. A guarantee has to be made that no processing cycle exceeds its time limit or other available resources, or else the integrity of the system is in danger.

Figure 2:
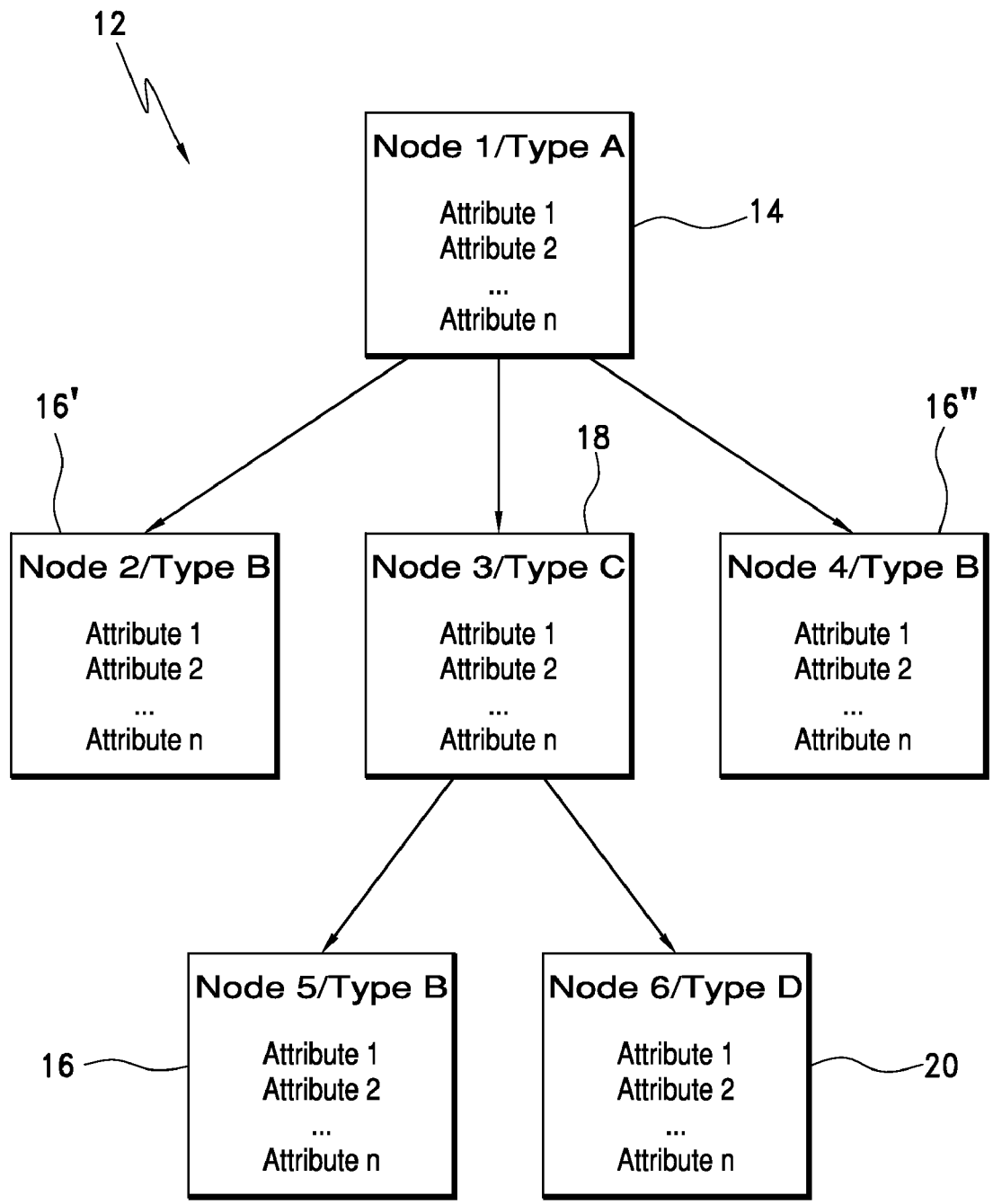
FIG. 2 (Prior Art) is an example of a tree structure that represents configuration information within a computing system.
Figure 3:
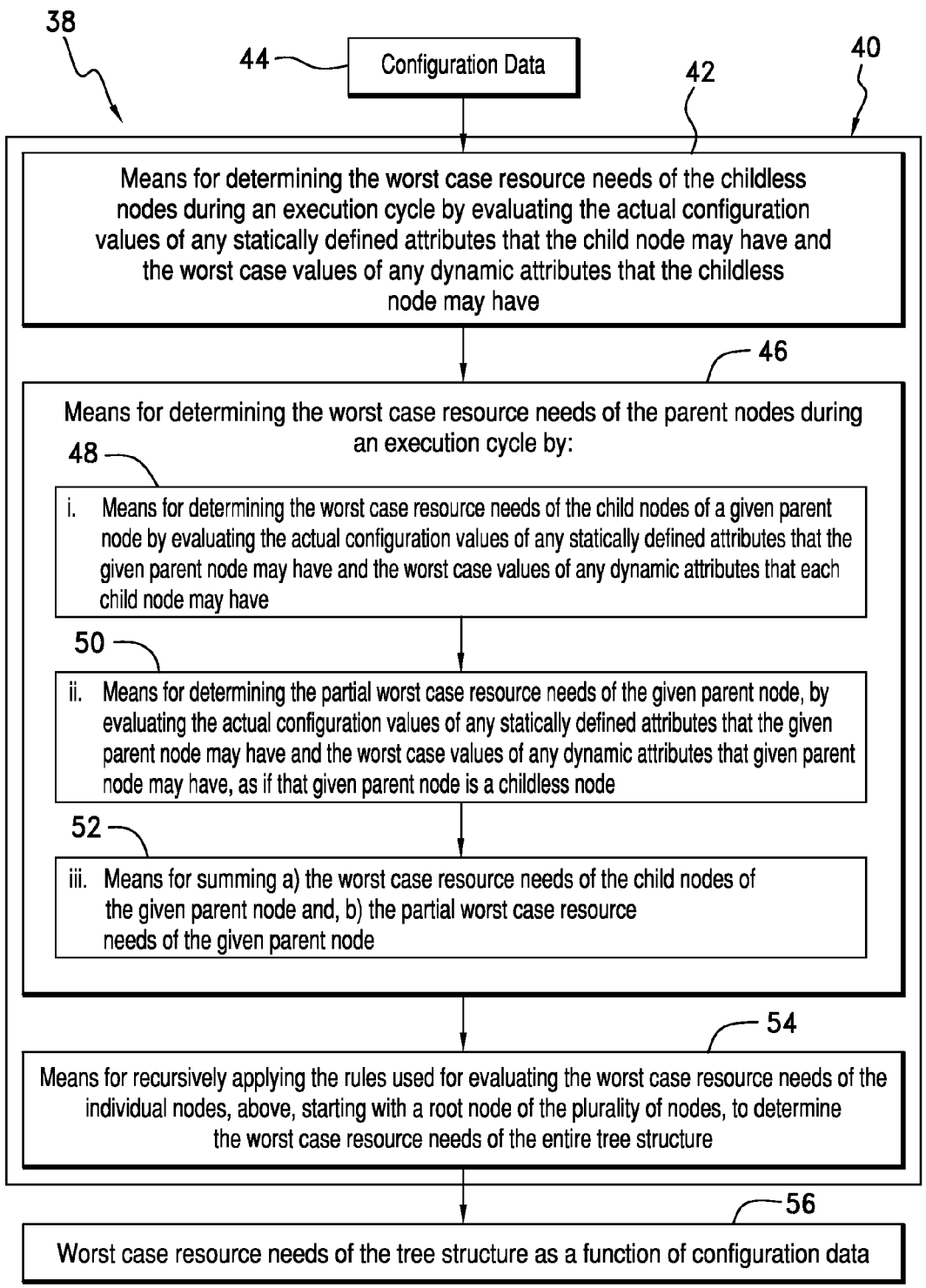

Referring now to FIG. 2, an example of a tree structure used to represent information within a computing system is illustrated, designated generally as 12. Nodes of predefined types are arranged such that each node (except the "root" node 14) has exactly one parent. A node can have zero or more child nodes. As can be seen in this figure, nodes have attributes that store data values. For example, in a display system where nodes represent graphical entities, these attributes can describe colors, line styles, coordinates and similar characteristics of these graphical entities. Many of these attributes have an impact on the resource needs of the entire node. For example, the value of an attribute that specifies whether or not a rectangle represented by a node is supposed to be filled (when drawn on a display) has an impact on the execution time, because it takes more time to fill a rectangular shape than to just draw an outline.

For the application in which the innovation is used, the structure of the trees (i.e., the number and types of nodes as well as their parent-child relationships) is determined by configuration files, and remains constant while the system is running. Attribute values are either constant (i.e. also read from the configuration files) or dynamic; in the latter case the values of attributes can change as the system is running. However, attributes cannot be added to or removed from a node after the configuration file has been processed—the type of each node determines what attributes the node has.

The worst case resource needs during an execution cycle for processing a childless node, i.e. Type B, designated 16, 16', 16", can be determined through measuring, analysis or some combination thereof. This will take into account the actual values of any constant attributes that the node may have. For any variable attributes, the theoretical worst-case is measured or analyzed and then used to determine the worst-case resource of the entire node. Continuing the example discussed above, if a node representing a rectangle has a constant attribute stating that the shape is not filled, the method can exploit this knowledge during the analysis and predict lower resource needs than if the rectangle was filled. If, on the other hand, this same attribute was variable (i.e. not statically defined in the configuration), the analysis has to assume the worst case value for it (in this case: assume the shape is filled).

To determine the resource needs for a parent node (i.e. one that has child nodes), such as node 3 (also designated 18), first determine the resource needs for each child node 16, 20. In the example shown above, once the resource needs for node 16 and node 20 are known, the resource needs for the sub-tree that starts at node 18 consists of the resource needs of node 18 plus the resource needs of any child nodes that may get processed during the tree traversal. Depending on the nature (type) of node 18, the worst case resource needs of the child nodes may be the sum of all their individual worst-case needs. However, some types of nodes are different: consider, for example, a node type that selects just one single child each cycle for further processing. In that case, the worst case execution time for the subtree beginning at node 18 is the time required by node 18, plus the greater of the times required by nodes 16 and 20.

Since nodes can be of very different types, it is effective to analyze each node type very carefully and exploit the knowledge such that the worst-case resource needs can be as low as possible.

Referring again now to FIG. 1, the above discussion can be summarized as follows:

Configuration data 22, which influences how the software application works, is introduced to the software application. As noted in process block 24, the worst case resource needs of the childless nodes are determined during an execution cycle by evaluating the worst case values of any selected attributes that the childless node may have.

As noted in process block 26, the worst case resource needs of the parent nodes are determined during an execution cycle. This is accomplished by: i) determining the worst case resource needs of the child nodes of a given parent node by evaluating the worst case values of any selected attributes that each child node may have (process block 28); ii) determining the partial worst case resource needs of the given parent node, by evaluating the worst case values of any selected attributes that given parent node may have, as if that given parent node is a childless node (process block 30); and, iii) summing the worst case resource needs of the child nodes of the given parent node and, the partial worst case resource needs of the given parent node (process block 32). As noted above, the term "'partial' worst case resource needs" refers to a determination of the parent node as if that parent node was a child node. Ultimately, when the resource needs for a node A that have children are computed, the recursive nature of the method results in data that characterizes the entire subtree beginning at that node A. However, to compute these resource needs, one first looks at node A in isolation (as if it did not have any children), and then combine the resource needs obtained that way (the 'partial' resource needs) with the resource needs computed for the children of node A.

The step of determining the worst case resource needs of the child nodes during an execution cycle preferably comprises distinguishing between constant and variable attributes that the node may have, and determining the worst case resource needs based on actual values of the constant attributes as well as worst case values of any variable attributes.

The step of determining the worst case resource needs of the parent nodes during an execution cycle preferably comprises determining whether the worst case needs of all child nodes of a parent node can be assumed to be less than the sum of the worst case resource needs of all individual child nodes.

In the final step, designated as process block 34, the rules used for evaluating the worst case resource needs of the individual nodes are recursively applied, starting with the root node, to determine the worst case resource needs of the entire tree structure, as noted by numeral designation 36.

As noted above, the present invention is particularly adaptable for use in new avionics systems. The new software application "ARINC 661 Graphics Server" (AGS), is so highly configurable that it is impossible to predict its resource needs in a generic way. Most of the configuration of the AGS happens through what is referred to as "ARINC 661 Definition Files" (DFs), which contain graphical widgets. The widgets in the Definition Files are stored in tree structures, where the nodes in the trees can be container widgets (which typically have child widgets) or regular graphical widgets without children (usually called "leafs" in a tree structure). Each node is of one of around 70 predefined types, and each type has certain memory footprints and performance characteristics, including for worst case scenarios. For example, one container widget type might draw (in the worst case) all child widgets, so the time required to process this node is the time it needs for itself plus each of the times computed for its children. A different container widget type might process at most one child widget, such that its worst case time can be computed as the time for its own processing plus the time for just one of its children, namely the one that takes the longest (in the worst case) to execute. Through the process noted above, the analyzer traverses the tree structures created from the DFs and applies its knowledge, recursively going through the tree until it reaches the leafs. It adds up computing times and memory needs as required and ultimately determines the theoretical worst case characteristics of the entire tree. The results of all individual trees are in turn compiled to a final result, depending on how the configuration ties the various trees together.

Determining the exact performance characteristics of each widget type is a manual task that has to be done just once, or when the AGS executable software changes. However, from then on, configuration changes (which are expected to happen much more frequently than AGS software changes) can be dealt with by re-running the Resource Analyzer.

The inventive principles of the present invention are particularly adaptable to other safety critical software systems outside of the aviation world, for example in automotive and medical systems. Many real-time or embedded software systems operate under the assumption that executing a software cycle does not exceed a specified maximum time, and if the amount of work to be performed in each cycle depends on the configuration of the software, these systems can benefit from the invention in the same way the AGS software does, as discussed above.

Other embodiments and configurations may be devised without departing from the spirit of the invention and the scope of the appended claims.

The invention claimed is:

1. A method for analyzing resource needs for a configurable computing system representing the configuration in a statically defined tree structure, said tree structure having a plurality of nodes representing stored configuration data, a first set of said nodes comprising childless nodes and a second set of said nodes comprising parent nodes, each parent node having at least one child node, each node having a plurality of attributes, a first set of said attributes being statically defined in the configuration under evaluation and a second set of said attributes being dynamically modifiable, the method for analyzing comprising the steps of:
   a) determining, by a computer system, the worst case resource needs of said childless nodes during an execution cycle by evaluating the actual configuration values of any statically defined attributes that the childless node may have and the worst case values of any dynamic attributes that the childless node may have;
   b) determining, by a computer system, the worst case resource needs of said parent nodes during an execution cycle by:
      i) determining the worst case resource needs of the child nodes of a given parent node, by evaluating the actual configuration values of any statically defined attributes that the child node may have and the worst case values of any dynamic attributes that each child node may have;
      ii) determining the partial worst case resource needs of said given parent node, by evaluating the actual configuration values of any statically defined attributes that the given parent node may have and the worst case values of any dynamic attributes that given parent node may have, as if that given parent node is a childless node; and,
      iii) summing a) said worst case resource needs of said child nodes of said given parent node and, b) said partial worst case resource needs of said given parent node; and,
   c) recursively, by a computer system, applying the rules used for evaluating the worst case resource needs of the individual nodes, above, starting with a root node of said plurality of nodes, to determine the worst case resource needs of said entire tree structure.

2. The method of claim 1, wherein said step of determining the worst case resource needs of said parent nodes during an execution cycle further comprises the step of determining whether the worst case needs of all child nodes of a parent node can be assumed to be less than the sum of the worst case resource needs of all individual child nodes.

3. A system for analyzing resource needs for a configurable computing system representing the configuration in a statically defined tree structure, said tree structure having a plurality of nodes configuration representing stored data, a first set of said nodes comprising childless nodes and a second set of said nodes comprising parent nodes, each parent node having at least one child node, each node having a plurality of attributes, a first set of said attributes being statically defined in the configuration under evaluation and a second set of said attributes being dynamically modifiable, the system for analyzing, comprising:
   a) means for determining the worst case resource needs of said childless nodes during an execution cycle by evaluating the actual configuration values of any statically defined attributes that the childless node may have and the worst case values of any dynamic attributes that the childless node may have;
   b) means for determining the worst case resource needs of said parent nodes during an execution cycle by:
      i) means for determining the worst case resource needs of the child nodes of a given parent node, by evaluating the actual configuration values of any statically defined attributes that the child node may have and the worst case values of any selected attributes that each child node may have;
      ii) means for determining the partial worst case resource needs of said given parent node, by evaluating the actual configuration values of any statically defined attributes that the given parent node may have and the worst case values of any dynamic attributes that given parent node may have, as if that given parent node is a childless node; and,
      iii) means for summing a) said worst case resource needs of said child nodes of said given parent node and, b) said partial worst case resource needs of said given parent node; and,
   c) means for recursively applying the rules used for evaluating the worst case resource needs of the individual nodes, above, starting with a root node of said plurality of nodes, to determine the worst case resource needs of said entire tree structure.

4. The system of claim 3, wherein said means for determining the worst case resource needs of said parent nodes during an execution cycle further comprises means for determining whether the worst case needs of all child nodes of a parent node can be assumed to be less than the sum of the worst case resource needs of all individual child nodes.

* * * * *